Sept. 21, 1971     C. M. DOBBS ET AL     3,606,848
FERTILIZER RIG
Filed Dec. 20, 1968     4 Sheets-Sheet 2
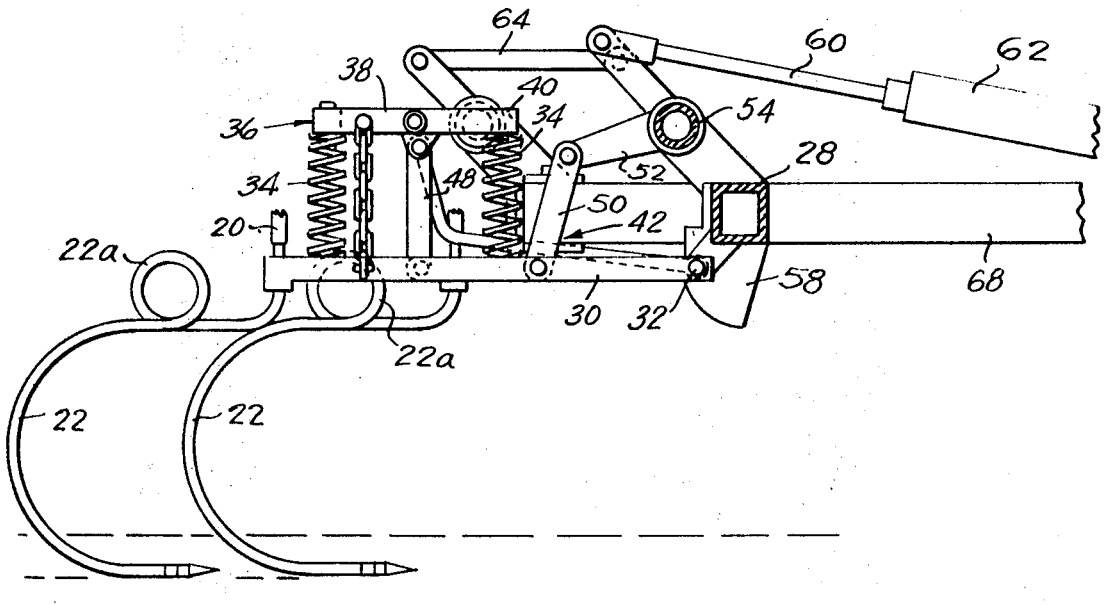
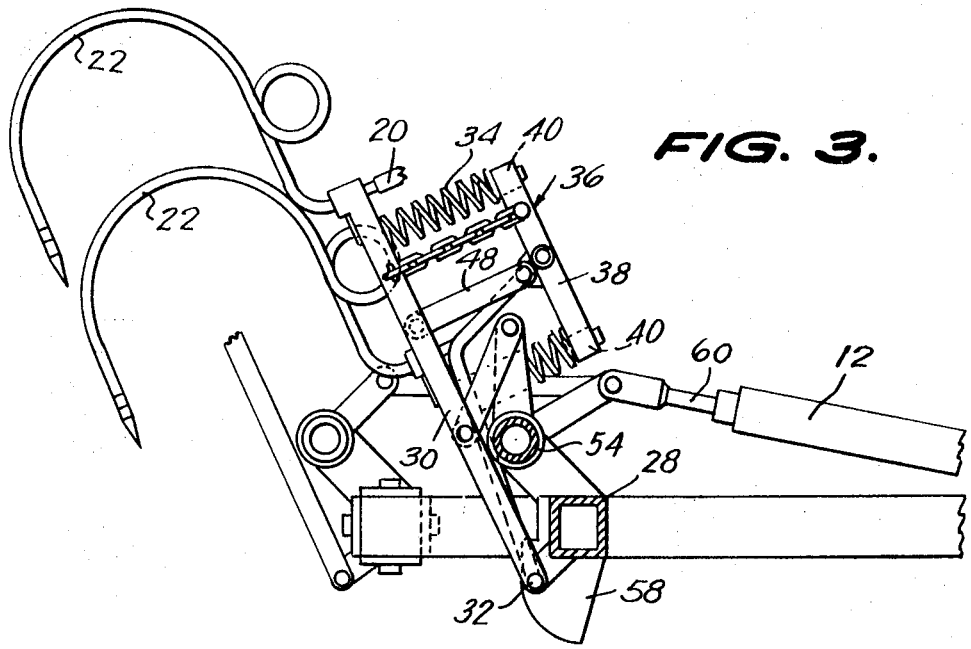
INVENTORS.
CHARLEY M. DOBBS,
ARLIE A. FULLERTON,

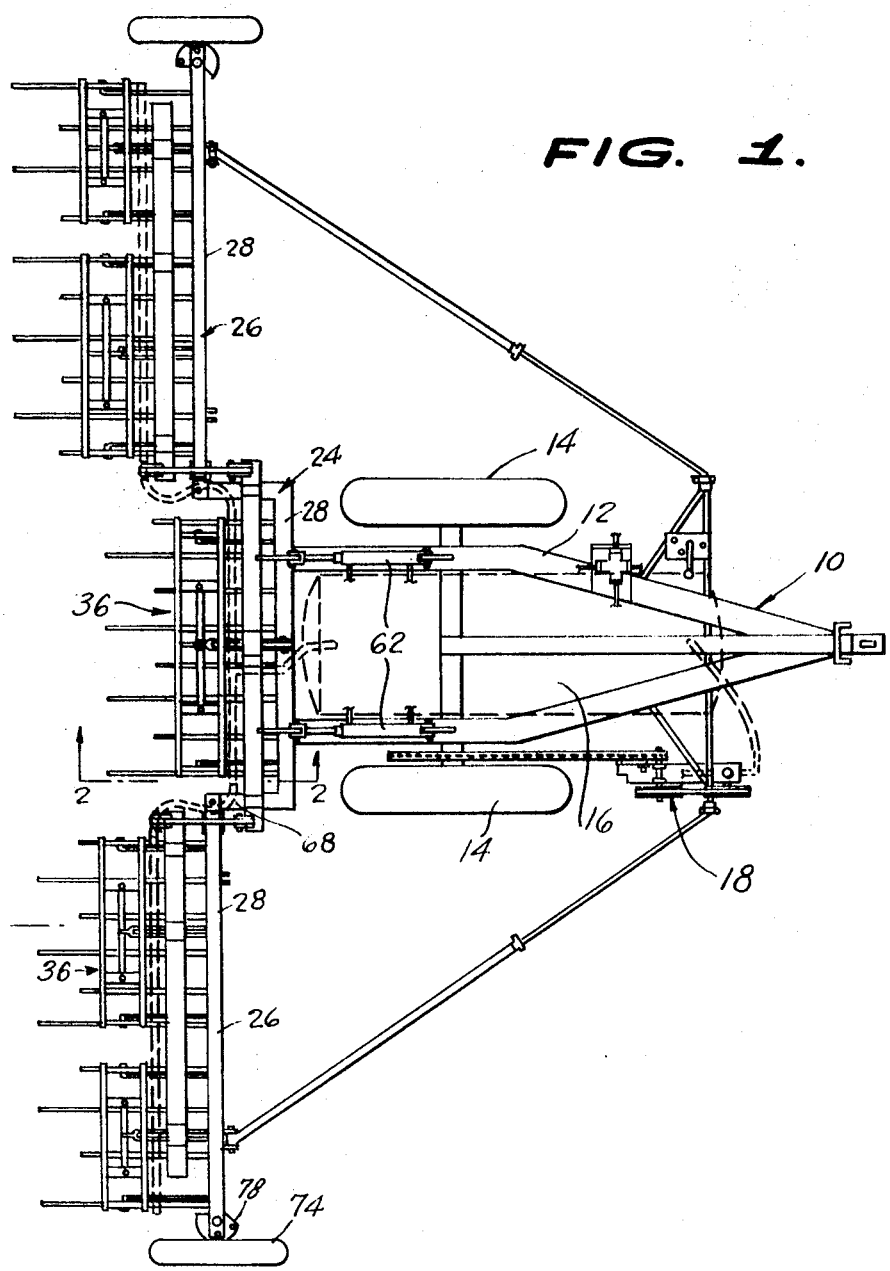

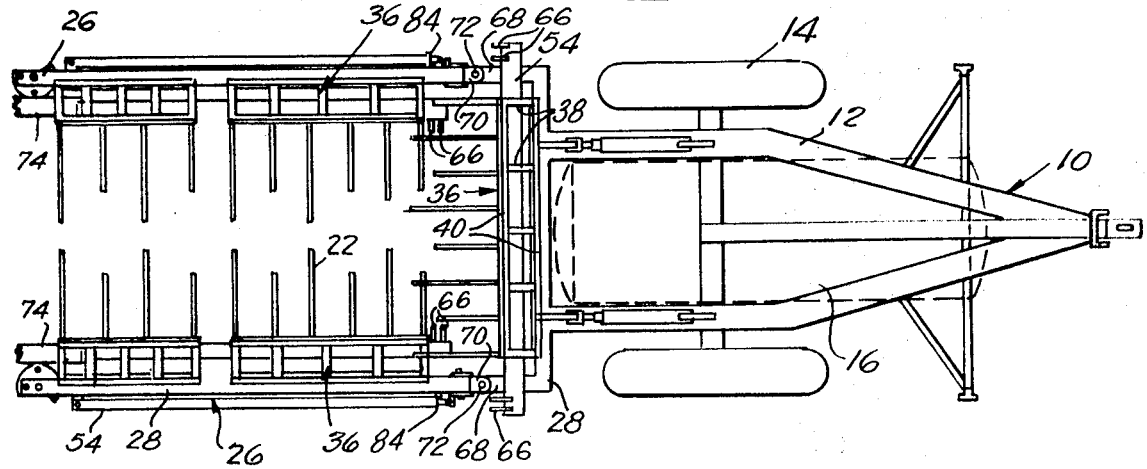

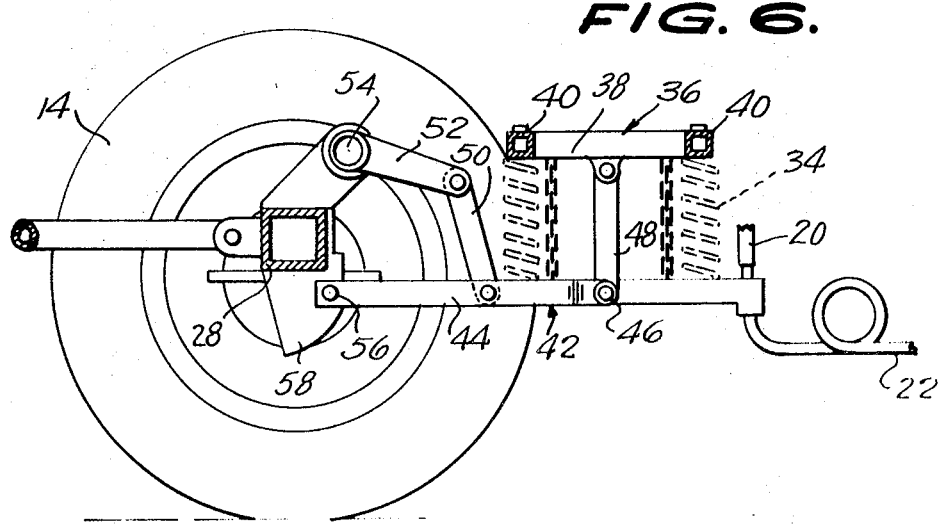
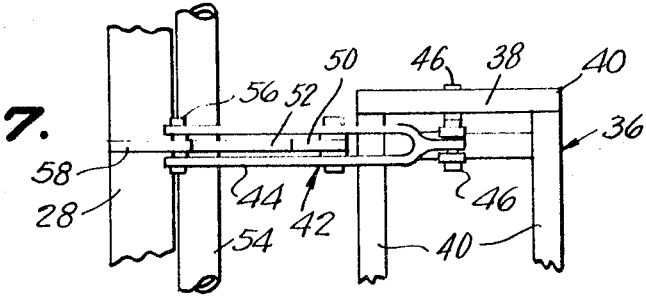
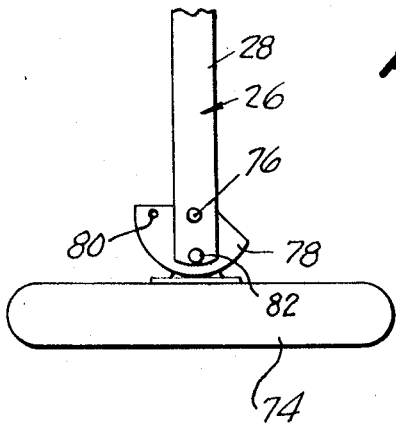

United States Patent Office 3,606,848
Patented Sept. 21, 1971

3,606,848
FERTILIZER RIG
Charley B. Dobbs, 515 E. Dayton Ave., and Arlie R. Fullerton, R.F.D. 3, Box 25, both of Dayton, Wash. 99328
Filed Dec. 20, 1968, Ser. No. 785,499
Int. Cl. A01b 49/00, 21/02; A01c 23/02
U.S. Cl. 111—7  4 Claims

ABSTRACT OF THE DISCLOSURE

A liquid-fertilizer-injecting rig having tubular, fertilizer-injecting tines for directly penetrating the soil. These tines are individually resiliently mounted for accommodating uneven terrain. The rig preferably comprises a trailer device having a plurality of sections including a middle section and two side sections, with one section directly behind the fertilizer tank and the side sections being disposed on either side thereof, so that the three sections can be pulled abreast of each other with means for disconnecting the side sections so they can be rotated 90 degrees and be disposed behind the central section when the rig is pulled along a narrow road.

THE INVENTION

The present invention relates to a fertilizer rig or apparatus and more particularly, to a fertilizer apparatus having a plurality of nozzles or tubes for injecting liquid fertilizer such as nitrogen and the like into the soil for conditioning the soil.

It is an object of the present invention to provide a fertilizer rig having a plurality of trailing sections that can be disposed laterally of each other so as to cover a wide area with disconnecting means for rotating the side sections approximately 90 degrees so that they are disposed behind or rearwardly of the central section when the fertilizer is not being applied, so that the rig can be transported over narrow roads and highways and the like.

It is another object of the present invention to provide a large capacity fertilizer rig with latch pin means connecting side sections to a middle section, so that the side sections can be swiveled rearwardly of the central section to permit the apparatus to be pulled along a narrow path or road to a point of use.

It is yet another object of the present invention to provide a fertilizer rig having a plurality of sections that are connected together so that they can operate as a unit laterally of each other, and with hydraulic ram means that operate torque tubes to allow the individual fertilizer nozzles or tines to be raised and lowered directly into the ground.

It is yet another object of the present invention to provide a fertilizer rig which allows for a trouble-free operation of the entire rig and is provided with a plurality of fertilizer tubes or tines which have means to permit them to float, so they are not held in a rigid position and will be properly disposed in the soil over uneven terrain.

Various other objects and advantages of the present invention will be readily apparent from the following detailed description when considered in connection with the accompanying drawings forming a part thereof, and in which:

FIG. 1 is a top plan view of the fertilizer rig embodying the present invention shown in a working position;

FIG. 2 is an enlarged fragmentary longitudinal vertical section taken along the line 2—2 of FIG. 1 illustrating the fertilizer tines disposed in a down position when they are working the soil;

FIG. 3 is a view similar to FIG. 2 but illustrating the tines in a raised position when they are not injecting fertilizer into the soil;

FIG. 4 is a view similar to FIG. 1 except it illustrates the fertilizer rig with the side sections folded rearwardly when it is not in a working position but in a position for transportation over a narrow road;

FIG. 5 is an enlarged fragmentary detailed view in top plan illustrating the connection between the middle section and a side section of the rig when they are disposed in a working position laterally of each other as in FIG. 1;

FIG. 6 is an enlarged fragmentary longitudinal vertical section taken along the line 6—6 of FIG. 5 showing a portion of the linkage utilized for raising the tines;

FIG. 7 is a bottom plan view of a portion of the linkage illustrated in FIG. 6; and FIG. 8 is a fragmentary detailed view of the means for rotating the wheel on a side section for towing it behind the middle section, when the rig is not in a working position.

Referring to the drawings, the reference numeral 10 generally designates a fertilizer rig or apparatus having a frame 12 carried by wheels 14. The rig is adapted to be towed by a tractor or the like, and is provided with a liquid nitrogen tank 16 and sprocket and belt means generally designated 18 for pumping the liquid nitrogen from the tank through a plurality of flexible tubes 20 for discharge through tines 22 into the soil to be treated.

Referring to FIGS. 1 and 4, the rig is provided with a middle or central fertilizer section 24 and side sections 26. All of the sections are substantially identical in construction, except that the side sections 26 are adapted to be disposed alongside of the middle section, as best seen in FIG. 1, when the rig is being used to fertilize the soil, and are adapted to be swiveled with respect to the middle section so as to trail therebehind, as best seen in FIG. 4, when the rig is being transported over a narrow road to a place of use.

Each section is provided with a frame 28 which includes a laterally extending, square, hollow bar, to the rear of which are pivotally connected a plurality of bracket arms 30, FIGS. 3 and 5 having curved tines 22 for directly penetrating and injecting fertilizer into the soil. It will be noted that the bracket arms 30, as best seen in FIGS. 4 and 5, have their front ends pivoted by pins 32 to the hollow bar of frame 28, and the alternate bracket arms are of uneven length so that the tines 22 adjacent each other are not disposed laterally of each other, but are out of alignment.

Each bracket arm 30 is provided with a spring member 34 thereabove, as best seen in FIGS. 2 and 3, so that the spring 34 will normally urge the bracket arm 30 and the tine 22 downwardly so that the individual tines will compensate for uneven terrain or into the ground that the rig is moved over, so that they will properly be disposed within the soil to be treated, as best seen in FIG. 2.

The springs 34 have their upper ends secured to a transversely extending rectangular frame 36. The frame 36 has spaced longitudinal bars 38 extending between the transverse bars 40 of the frame 36.

The frame 36 is adapted to be raised or lifted so that the tines are removed from the working position shown in FIG. 2 to a position out of contact with the soil, or a raised position, as shown in FIG. 3, by a linkage generally indicated as 42, as seen in FIGS. 2 and 6 and 7. The linkage 42 is provided with a fork 44 connected by a pin 46 to a vertical link 48, which is connected to a longitudinal bar 38, as best seen in FIGS. 5, 6 and 7. The fork 44 is connected to a link 50 in turn connected to a bifurcated link member 52. The link member 52 in turn is connected to a transversely extending torque tube or bar 54. The front end of the fork 44 is pivotally connected by a pin 56 to a plate 58 secured to the square hollow tube of the frame 28. The torque bar 54 is operatively connected to the plunger or piston rod 60 of the hydraulic ram 62, FIG. 5. The ram 62 is adapted to partially rotate the torque bar 54 so as to raise the frame 36, linked thereto by the linkage 42, in order to raise the tines from the down position, shown in FIG. 2, to the raised position shown in FIG. 3, when the fertilizer rig is not in a working position.

Referring to FIG. 5, it will be noted that the torque bar 54 of the central section is connected to the torque bar 54 of a side section 26 by a connecting link 64 and removable pivot pin 65, such link 64 being connected at its opposite ends by another removable pivot pin 65 to other lugs or ears 66 disposed on the ends of the torque bars 54.

It will further be noted that the center section 24 is provided with rearwardly extending portions 68, as best seen in FIG. 5, on opposite sides of the hollow square member 28 of the frame, while the ends of the side sections 26 are provided with a connecting member 70 on the inner end thereof, through which extends a vertical pin 72 for swivelly or pivotally connecting the center section 24 to the side section 26. The pivot pin permits the side section to be swung rearwardly of the center section 24, as best seen in FIG. 4, when the rig is not in a working condition. It is only necessary to remove the connector link 64 from between the lugs 66 and then to swing the side section 26 rearwardly.

The side sections 26, as best seen in FIG. 4, are provided with wheels 74 adjacent the outer ends of their respective frames 28. The wheels 74 attached to the frame 28 of the side section by a vertical pin 76 extend parallel with the frame 28 in this folded, transport condition of the rig, and transversely thereof in the extended, working condition of the rig shown in FIG. 1. The wheels 74 are each provided with a horizontal plate 78, FIG. 8, having a set of spaced apertures 80 therein for receiving a pin 82 in one or the other of such apertures, depending upon the condition of the rig. Each wheel 74 can be rotated 90 degrees from the running position shown in FIGS. 1 and 8 to the different running position shown in FIG. 4, so that the side sections 26 can be towed in a trailing position, as shown in FIG. 4, or in a spread apart working position, as shown in FIG. 1.

The torque bar 54 of each side section 26 preferably has a telescoping end portion 84, which will slide within the main central portion of the torque bar 54 when the connector links 64 have been removed and the side sections have been rotated to their compact position, as shown in FIG. 4.

Thus, from the foregoing description, it is apparent that the present invention provides a fertilizer rig that has three sections, including a middle section and two side sections, with a plurality of individual spring-loaded tines for injecting fertilizer into soil, so that the rig can cover a wide area when it is in use, with the side sections being adapted to be disconnected from the central section and pivotally rotated or swung in a 90 degree direction away from their normal operating position, so that they can trail or be disposed rearwardly of the central section of the rig, so that the rig can be transported over a narrow road to another place of use.

It should be noted, see particularly FIG. 2, that each tine 22 is advantageously of approximately semi-circular configuration, with a loop 22a at its top side to impart resiliency against retarding force exerted along the horizontal.

From the foregoing description, it will be apparent that various changes may be made in the form, location and relative arrangement of several parts without departing from the essential characteristics of the invention, and it is to be understood that this invention is not to be limited except by the scope of the appended claims.

What is claimed is:

1. A rig for injecting liquid fertilizer into soil, comprising a wheeled vehicular frame adapted to travel over soil to be fertilized; a central fertilizer-distributing section and oppositely extending fertilizer-distributing sections, the central section including a transverse member with rearwardly extending end portions and the side sections including respective transverse members pivotally connected to said end portions, respectively, rearwardly thereof and normally extended laterally but swingable rearwardly for travel along a roadway, the said transverse members of the side sections having supporting wheels pivotally mounted at their free end portions for locking securement in either working or travelling positions; a plurality of soil-penetrating and fertilizer-injecting tines carried by said sections and spaced therealong as a series normally extending transversely of the direction of vehicle travel; means resiliently mounting said tines of said sections for individual reaction to said terrain along respective vertical planes; transverse torque bars for the respective sections; linkage normally interconnecting said torque bars of the respective sections but detachable to enable said side sections to be swung rearwardly of said central section; means for operating said torque bars to lift and lower said tines as a group relative to the soil; and means for supplying liquid fertilizer to said tines.

2. A rig in accordance with claim 1, wherein the linkage normally interconnecting the torque bars comprise lugs projecting from fixed securement to said torque bars and links detachably connected to respective sets of lugs by removable pivot pins.

3. A rig in accordance with claim 1, wherein the means resiliently mounting the tines on the vehicular frame comprise individual bracket arms pivotally attached to said frame at corresponding ends thereof and having the respective tines secured thereto at corresponding opposite ends thereof and depending therefrom for penetrating engagement with the soil; means normally maintaining a fixed level relative to said vehicle frame; and spring means interposed between the fixed level means and the respective bracket arms resiliently biasing said bracket arms against upward movement.

4. A rig in accordance with claim 3, wherein the fixed level means comprise a reaction frame extending transversely of the vehicular frame along the series of tines and bracket arms, and means for maintaining said frame at fixed level; and the spring means comprise springs interposed between said reaction frame and the individual bracket arms; and wherein the means for raising and lowering the plurality of tines as a group is connected to said reaction frame.

References Cited

UNITED STATES PATENTS

| | | | |
|---|---|---|---|
| 965,623 | 7/1910 | Douglas | 111—7 |
| 2,755,720 | 7/1956 | Markel | 172—462X |
| 2,973,818 | 3/1961 | Marvin | 172—456 |
| 3,174,446 | 3/1965 | Clarke et al. | 111—7 |
| 3,410,234 | 11/1968 | Peifer | 172—456X |
| 3,422,909 | 1/1969 | Jacobs | 172—456X |
| 2,973,729 | 3/1961 | Peck | 111—7 |
| 3,086,598 | 4/1963 | Gellner | 172—456 |
| 3,327,787 | 6/1967 | Adee | 172—311 |

ROBERT E. PULFREY, Primary Examiner

S. C. PELLEGRINO, Assistant Examiner

U.S. Cl. X.R.

172—311, 456, 462